(12) United States Patent
Morano et al.

(10) Patent No.: US 8,543,494 B2
(45) Date of Patent: Sep. 24, 2013

(54) SHARED APPRECIATION LOAN MODIFICATION SYSTEM AND METHOD

(75) Inventors: Thomas Morano, Charlotte, NC (US); Peter Fail, Concord, NC (US); Kenneth O'Rorke, Tampa, FL (US); Edna Marshall, Charlotte, NC (US); Allison Cicero, Jacksonville, FL (US); Randy Shields, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 441 days.

(21) Appl. No.: 12/684,413

(22) Filed: Jan. 8, 2010

(65) Prior Publication Data
US 2010/0179904 A1 Jul. 15, 2010

Related U.S. Application Data

(60) Provisional application No. 61/143,606, filed on Jan. 9, 2009.

(51) Int. Cl.
*G06Q 40/02* (2012.01)

(52) U.S. Cl.
CPC .............. *G06Q 40/02* (2013.01); *G06Q 40/025* (2013.01)
USPC .................... 705/38; 705/39; 705/35; 705/30

(58) Field of Classification Search
CPC ..... G06Q 40/02; G06Q 40/025; G06Q 40/22; G06Q 20/00; G06Q 20/0215; G06Q 30/0215
USPC ......................................... 705/30, 35, 38, 39
See application file for complete search history.

(56) References Cited

U.S. PATENT DOCUMENTS

| 5,644,726 A | 7/1997 | Oppenheimer |
| 5,870,720 A | 2/1999 | Chusid et al. |

(Continued)

FOREIGN PATENT DOCUMENTS

| WO | WO 00/65508 | 11/2000 |
| WO | WO 2004/066169 A1 | 8/2004 |

(Continued)

OTHER PUBLICATIONS

Home loans; Split home lowns, cheap Interest Rates, Commercial Loans, refinancing by www.ausiefinancials.com.au/split_home_loans.htm; 2008 2 pages.*

(Continued)

*Primary Examiner* — Ella Colbert
*Assistant Examiner* — Mary Gregg
(74) *Attorney, Agent, or Firm* — Michael A. Springs; Moore & Van Allen, PLLC; Jeffrey R. Gray (57) ABSTRACT

Embodiments of the present invention provide systems, methods, and computer program products for modifying the terms of a loan and for providing for a shared appreciation loan program. For example, in one embodiment the amount owed on an existing HELOC is split into two portions. A qualifying borrower can defer the obligation to pay interest and payments on a portion of the HELOC in exchange for sharing up to 50% of the future appreciation in the real property that serves as the underlying security for the HELOC. This mortgage plan can provide an incentive for the borrower to remain in the home since the borrower may be able to share in the appreciation of the home even if the home never appreciates beyond the full amount owed on the home, while at the same time preserving the borrower's financial commitment rating and reducing the borrower's monthly payment.

36 Claims, 6 Drawing Sheets

(56) References Cited

U.S. PATENT DOCUMENTS

| | | |
|---|---|---|
| 5,930,775 A | 7/1999 | McCauley et al. |
| 5,950,175 A | 9/1999 | Austin |
| 5,966,700 A | 10/1999 | Gould et al. |
| 5,983,206 A | 11/1999 | Oppenheimer |
| 6,006,207 A | 12/1999 | Mumick et al. |
| 6,067,533 A * | 5/2000 | McCauley et al. .............. 705/38 |
| 6,269,347 B1 | 7/2001 | Berger |
| 6,298,335 B1 | 10/2001 | Bernstein |
| 6,345,262 B1 | 2/2002 | Madden |
| 6,647,375 B1 | 11/2003 | Gelman et al. |
| 6,671,677 B2 | 12/2003 | May |
| 6,904,414 B2 | 6/2005 | Madden |
| 6,910,021 B2 | 6/2005 | Brown et al. |
| 6,912,510 B1 | 6/2005 | Shepherd |
| 6,938,008 B1 | 8/2005 | Stokes |
| 7,020,631 B2 | 3/2006 | Freeman et al. |
| 7,107,239 B2 | 9/2006 | Graff |
| 7,213,001 B2 | 5/2007 | DeSane |
| 7,219,079 B2 | 5/2007 | Birle, Jr. et al. |
| 7,254,556 B2 | 8/2007 | Fry |
| 7,295,987 B2 | 11/2007 | Graff |
| 7,303,122 B2 | 12/2007 | Czyzewski et al. |
| 7,346,567 B2 | 3/2008 | Weeks |
| 7,373,328 B1 | 5/2008 | Butcher, III |
| 7,379,912 B1 | 5/2008 | Camin et al. |
| 7,386,507 B2 | 6/2008 | Davis et al. |
| 7,395,233 B2 | 7/2008 | Weeks |
| 7,398,242 B2 | 7/2008 | Laederich et al. |
| 7,401,050 B2 | 7/2008 | O'Neill |
| 7,440,926 B2 | 10/2008 | Harrington |
| 7,558,756 B1 * | 7/2009 | Wesly et al. .................... 705/38 |
| 2001/0044772 A1 | 11/2001 | Allen et al. |
| 2003/0110111 A1 | 6/2003 | Nalebuff et al. |
| 2004/0220872 A1 | 11/2004 | Pollock, III |
| 2005/0108029 A1 | 5/2005 | Schneider |
| 2005/0108122 A1 | 5/2005 | Schneider |
| 2005/0108123 A1 | 5/2005 | Schneider |
| 2005/0108136 A1 | 5/2005 | Schneider |
| 2005/0114260 A1 | 5/2005 | Gula et al. |
| 2005/0149433 A1 | 7/2005 | Rothstein |
| 2005/0182702 A1 | 8/2005 | Williams, III |
| 2005/0197947 A1 | 9/2005 | Tyson |
| 2005/0246267 A1 | 11/2005 | Nichols |
| 2005/0246270 A1 | 11/2005 | Goodman |
| 2005/0262016 A1 | 11/2005 | Hill et al. |
| 2005/0278246 A1 * | 12/2005 | Friedman et al. .............. 705/38 |
| 2005/0289044 A1 | 12/2005 | Breslin et al. |
| 2006/0015364 A1 | 1/2006 | Hays |
| 2006/0059073 A1 | 3/2006 | Walzak |
| 2006/0074794 A1 | 4/2006 | Nespola, Jr. |
| 2006/0085325 A1 | 4/2006 | Jammal et al. |
| 2006/0089895 A1 | 4/2006 | Joye et al. |
| 2006/0200406 A1 | 9/2006 | Burke |
| 2006/0248000 A1 | 11/2006 | Graeve et al. |
| 2006/0248001 A1 | 11/2006 | Graeve et al. |
| 2006/0271458 A1 | 11/2006 | Arnold, III et al. |
| 2006/0271472 A1 | 11/2006 | Cagan |
| 2006/0271473 A1 | 11/2006 | Pollock, III et al. |
| 2006/0282371 A1 | 12/2006 | Doyle et al. |
| 2006/0287946 A1 | 12/2006 | Toms |
| 2006/0293987 A1 | 12/2006 | Shapiro |
| 2007/0016518 A1 | 1/2007 | Atkinson et al. |
| 2007/0027799 A1 | 2/2007 | Manelis et al. |
| 2007/0038533 A1 | 2/2007 | Huff |
| 2007/0043654 A1 | 2/2007 | Libman |
| 2007/0050287 A1 | 3/2007 | Capozza |
| 2007/0067234 A1 | 3/2007 | Beech |
| 2007/0083459 A1 | 4/2007 | Eubanks |
| 2007/0094125 A1 | 4/2007 | Izyayev |
| 2007/0094126 A1 | 4/2007 | Bufford |
| 2007/0094127 A1 | 4/2007 | Izyayev |
| 2007/0100743 A1 | 5/2007 | Barge et al. |
| 2007/0136186 A1 | 6/2007 | Libman |
| 2007/0136187 A1 | 6/2007 | Libman |
| 2007/0185806 A1 | 8/2007 | Serio et al. |
| 2007/0192244 A1 | 8/2007 | Drummond et al. |
| 2007/0203827 A1 | 8/2007 | Simpson et al. |
| 2007/0219899 A1 | 9/2007 | Neckopulos |
| 2007/0239597 A1 | 10/2007 | Nguyen-khoa et al. |
| 2007/0250439 A1 | 10/2007 | Crocker |
| 2007/0271177 A1 | 11/2007 | April et al. |
| 2007/0271197 A1 | 11/2007 | Law |
| 2007/0282737 A1 | 12/2007 | Brasch |
| 2007/0288357 A1 * | 12/2007 | Holman et al. .................. 705/38 |
| 2007/0288361 A1 | 12/2007 | Martignoni |
| 2007/0288362 A1 | 12/2007 | Pollock, III et al. |
| 2008/0010188 A1 | 1/2008 | Beardsell et al. |
| 2008/0103963 A1 | 5/2008 | Mahoney et al. |
| 2008/0109347 A1 | 5/2008 | Pilcher et al. |
| 2008/0120225 A1 | 5/2008 | Pavlov et al. |
| 2008/0120227 A1 | 5/2008 | Erbey et al. |
| 2008/0162336 A1 | 7/2008 | Jaffee |
| 2008/0183616 A1 | 7/2008 | Hankey et al. |
| 2008/0183617 A1 * | 7/2008 | Schneider .................. 705/39 |
| 2008/0189204 A1 * | 8/2008 | Hansford .................. 705/38 |
| 2008/0215479 A1 | 9/2008 | Pollock et al. |
| 2008/0215480 A1 | 9/2008 | Mordecai |
| 2008/0215481 A1 | 9/2008 | Schnall |
| 2008/0222028 A1 | 9/2008 | Santiago |
| 2008/0228634 A1 | 9/2008 | Unwin |
| 2008/0235130 A1 | 9/2008 | Malov et al. |
| 2008/0243569 A1 | 10/2008 | Hadden |
| 2008/0243678 A1 | 10/2008 | Hooley et al. |
| 2008/0243679 A1 | 10/2008 | McMurray et al. |
| 2008/0243680 A1 | 10/2008 | Megdal et al. |
| 2008/0243682 A1 | 10/2008 | Shavit et al. |
| 2008/0243719 A1 | 10/2008 | Shavit et al. |
| 2008/0249809 A1 * | 10/2008 | Rosen et al. .................. 705/4 |
| 2008/0249925 A1 | 10/2008 | Nazari et al. |
| 2008/0255985 A1 | 10/2008 | Hoffman |
| 2008/0256003 A1 | 10/2008 | Maxey |
| 2008/0270192 A1 | 10/2008 | McAlery |
| 2008/0275812 A1 | 11/2008 | Stone |
| 2008/0281751 A1 | 11/2008 | Robinson et al. |
| 2008/0288415 A1 | 11/2008 | Ghosh et al. |

FOREIGN PATENT DOCUMENTS

| | | |
|---|---|---|
| WO | WO 2004/097588 A2 | 11/2004 |
| WO | WO 2006/086315 A3 | 8/2006 |
| WO | WO 2006/116598 A2 | 11/2006 |
| WO | WO 2006/116599 A2 | 11/2006 |
| WO | WO 2006/125275 A1 | 11/2006 |
| WO | WO 2007/068863 A2 | 6/2007 |
| WO | WO 2008/065625 A1 | 6/2008 |

OTHER PUBLICATIONS

FAcilitating Shared Appriciation Mortgages to prevent Housing crashes and Affordability Crisis by Andrew CAplin at Brookling Institution: Sep. 2008, 8 pages.*

Citigroup Loan Modification—Help to Apply and Qualify; by Susan V. Gregory; 2 pages at activerain.com/blogsview/785104/citigroup-loan-modification-help-to-apply-qualify.*

Introduction of the Streamlined Modification Program by Fannie Mae; Dec. 12, 2008 ; 16 pages.*

Another Crisis in the Making: How the subprime mortgage Industry is Sandbagging Katrina-affected Homeowners by Acorn; Sep. 22, 2005; 17 pages.*

Home Appreciation Mortgage Plan by Zandi et al.: Moody's Economy.com May 2008; 15 pages.*

Retiring Plan No so super by Barrymore; 2 pages ; The Sunday Times ; Perth, W.A; Jan. 20, 2008.*

"Never mind the weather." Australasian Business Intelligence. COMTEX News Network, Inc. 2002. HighBeam Research. <http://www.highbeam.com>.*

* cited by examiner

FIG. 6

SHARED APPRECIATION LOAN MODIFICATION SYSTEM AND METHOD

CLAIM OF PRIORITY UNDER 35 U.S.C. §119

The present Application for a Patent claims priority to Provisional Application No. 61/143,606 entitled "Shared Appreciation Loan Modification" filed Jan. 9, 2009, and assigned to the assignees hereof and hereby expressly incorporated by reference herein.

FIELD

This invention relates generally to the field of loan modification, and more particularly, embodiments of the invention relate to systems, methods, and computer program products for modifying the terms of home mortgages.

BACKGROUND

During an economic downturn housing prices sometimes fall across the United States, as well as in many foreign nations. In turn, many homeowners who purchased heavily leveraged houses or borrowed against their equity in their home can be left holding property with market values that are lower than the debt the owners owe on their home. As a result a segment of homeowners who have the ability to pay their mortgage payments fail to meet the contract terms of the mortgage as a result of the significant negative equity positions in the collateral property.

When payment on a home loan is not made, banks and other financial institutions that are owed the loan amount may reclaim the home in an effort to recoup some of their losses. In some instances, banks lose thousands of dollars reclaiming a home since the market value of many of these homes is less than what the bank is owed on the loan amount.

There is a need to establish a program which will give homeowners an incentive to continue making payments on their homes and, at the same time, give the financial institutions the ability to mitigate and defer their losses.

BRIEF SUMMARY

Embodiments of the invention address the above needs and/or achieve other advantages by providing a method, system, computer program product, or a combination of the foregoing for a shared appreciation mortgage loan modification plan ("Mortgage Plan" or "Plan"). Generally under this plan the bank will modify the homeowner's loan in exchange for a right to a share of the future value of the home.

Embodiments of the present invention provide systems, methods, and computer program products for modifying the terms of a loan, such as, for example, a Home Equity Line of Credit (HELOC). In one embodiment, the amount owed on an existing HELOC is split into two portions: a "Deferred Principal" portion and a "HELOC Principal" portion. Each of the two portions is subject to different terms. In one embodiment of the Mortgage Plan, a qualifying borrower can defer the obligation to pay interest and payments on a portion of the HELOC in exchange for sharing (e.g., with the bank) up to 50% of the future appreciation in the real property that serves as the underlying security for the HELOC. In one embodiment of the invention, the borrower will never pay more than he or she would have paid prior to entering into the Mortgage Plan. Instead, embodiments of the Mortgage Plan can provide an incentive for the borrower to remain in the home since the borrower may be able to share in the appreciation of the home even if the home never appreciates beyond the full amount owed on the home, while at the same time preserving the borrower's financial commitment rating and reducing the borrower's monthly payment. The bank may benefit from the Mortgage Plan by both reducing and deferring losses.

In one embodiment of the invention, there are a number of requirements a homeowner with a HELOC may have to meet before being eligible to participate in the Mortgage Plan. First, the HELOC may have to be in the second lien position. Second, the underlying real property may have to have depreciated sufficiently so that, at current valuations, the combined loan-to-value ratio is greater than 110% (or some other pre-defined value), and in some embodiments not greater than 125% (or some other pre-defined value). In some embodiments, the bank (or its designee) determines the value of the underlying real property at the time the borrower applies for or enters into the Mortgage Plan. In one embodiment, the borrower may also have to submit full financial information to the bank and meet the bank's financial commitment rating and collateral requirements. In one embodiment, the borrower agrees that he or she will not make additional draws on the HELOC until the Deferred Principal is repaid.

In one embodiment, if a borrower qualifies for the Mortgage Plan, the bank may defer up to 50% of the balance owed on the HELOC ("the Deferred Principal"). The period of deferment in some embodiments is the remaining term of the original ten (10) year draw period of the HELOC or, in the alternative, until the sale of the underlining real property to a third party, whichever occurs first. The remaining 50%, or less, of the balance owed under the HELOC ("the HELOC Principal") is subject to the original terms of the HELOC. No payments will be due on the Deferred Principal, as long as the borrower honors the obligations of the original HELOC agreement with respect to the HELOC Principal. However, the underlying real property will continue to secure the Deferred Principal. In one embodiment, the Mortgage Plan also restricts the borrower to a minimum term of twelve (12) months after entering the Plan before the deferral period can end through a sale of the property.

In one embodiment, if the borrower either fails to make the payments of the contract on the HELOC Principal amount after entering into the Mortgage Plan, breaks other contract terms of the Mortgage Plan, or refinances, the bank is entitled to full repayment under the original HELOC terms. In response, the bank may reclaim the residence, or may decide to let the borrower remedy the failure to meet the contract terms of the mortgage, etc. If the borrower remedies the failure to meet the contract terms of the mortgage, the bank is still entitled to a shared appreciation percentage of the underlying real property. In the case of reclamation of a home, the bank is entitled to the HELOC Principal and interest as well as the Deferred Principal and interest.

In one embodiment, the Mortgage Plan will end at either the end of the ten (10) year draw period of the original HELOC or at the sale of the underlying real property, whichever occurs first. At the end of the plan's term, the bank (or its designee) will again determine the value of the property and the borrower will pay the bank the initial shared appreciation percentage, up-to fifty percent (50%), of the amount by which the value of the real property increased from the initial valuation (less certain capital improvements). In the alternative, the borrower can pay to the bank the Deferred Principal if it is less than the bank's share in the appreciation of the underlying real property.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements.

Although the embodiments of the invention described herein are generally described as involving a "bank," one of ordinary skill in the art will appreciate that other embodiments of the invention may involve other businesses or financial institutions that take the place of, or work in conjunction with, a bank to perform one or more of the processes or steps described herein as being performed by a bank. It should also be understood that terms like "bank," "financial institution," and "institution" are used herein in their broadest sense. Institutions, organizations, or even individuals that process loans are widely varied in their organization and structure. Terms like bank and financial institution are intended to encompass all such possibilities, including but not limited to, finance companies, stock brokerages, credit unions, mortgage companies, manufacturers who grant loans to secure the purchase of goods, computer companies, etc. Additionally, disclosed embodiments may suggest or illustrate the use of agencies or contractors external to the financial institution to perform some of the calculations and data repository services. These illustrations are examples only, and an institution or business can implement the entire invention on its own computer systems or even a single work station if appropriate databases are present and can be accessed.

As will be appreciated by one of skill in the art in view of this disclosure, the present invention may be embodied as an apparatus (e.g., a system, computer program product, and/or other device), a method, or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-readable storage medium having computer-executable program code embodied in the medium.

Any suitable computer-readable medium may be utilized. The computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; or other tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer-executable program code for carrying out operations of embodiments of the present invention may be written in an object oriented, scripted or unscripted programming language such as Java, Perl, Smalltalk, C++ or the like. However, the-executable program code for carrying out operations of the invention may also be written in conventional procedural programming languages, such as the "C" programming language or similar programming languages.

Embodiments of the present invention are described below with reference to flowchart illustrations and/or block diagrams of methods, apparatuses (e.g., systems), and computer program products according to embodiments of the invention. It will be understood that each block of the flowchart illustrations and/or block diagrams, and combinations of blocks in the flowchart illustrations and/or block diagrams, can be implemented by computer-executable program code. These computer-executable program code may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

This computer-executable program code may also be stored in a computer-readable memory that can direct a computer or other programmable data processing apparatus to function in a particular manner, such that the instructions stored in the computer-readable memory produce an article of manufacture, including instruction mechanisms, which implement the function/act specified in the flowchart and/or block diagram block or blocks.

The computer-executable program code may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer-implemented steps or acts may be combined with operator or human implemented steps or acts in order to carry out an embodiment of the invention.

Embodiments of the present invention may further provide a plurality of user interfaces to be displayed using a display device communicatively coupled to a computing device. These user interfaces are generated and operated by a processor executing computer-executable program code embodied in a computer-readable medium. The user interfaces may display sign-on, overview, and/or maintenance screens for managing the schedules of the Mortgage Plan described herein.

Figure 1:
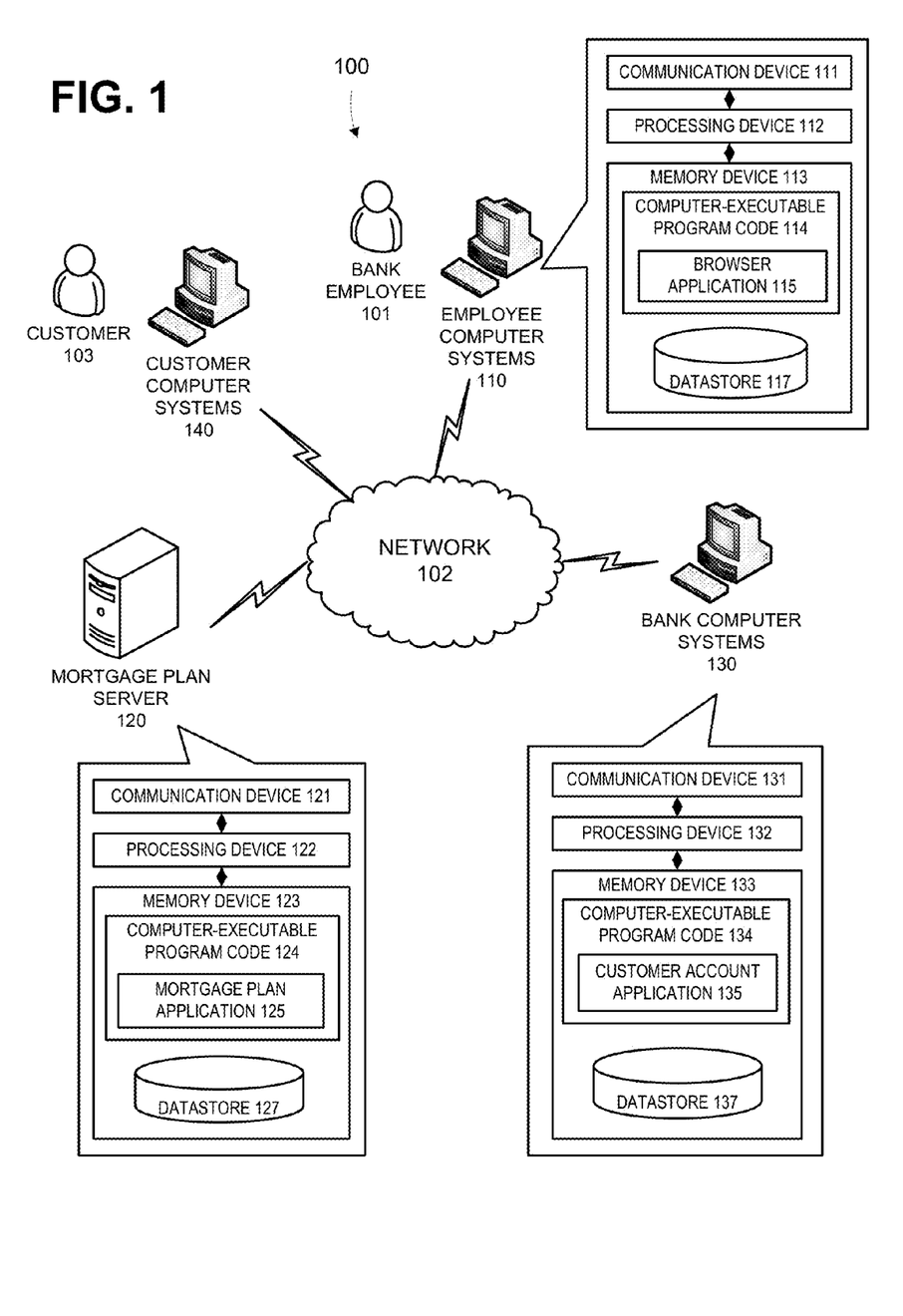
FIG. 1 provides a block diagram illustrating a Mortgage Plan system, in accordance with one embodiment of the present invention.

FIG. 1 illustrates a banking environment and a Mortgage Plan system 100 in accordance with an embodiment of the present invention. As illustrated in FIG. 1, a bank employee 101 has access to employee computer systems 110. The employee computer systems 110 are operatively coupled, via a network 102, to a Mortgage Plan server 120, bank computer systems 130, and customer computer systems 140. In this way the employee computer systems 110 can receive electronic data regarding a customer's accounts and mortgage services provided by the bank. The network 102 may be a global area network (GAN), such as the Internet, a wide area network (WAN), a local area network (LAN), or any other type of network or combination of networks. The network 102 may provide for wireline, wireless, or a combination of wireline and wireless communication between devices in the network. In other embodiments, two or more of the computer systems illustrated in FIG. 1 are combined to form a single computer system that performs the functions described herein as being performed by separate computer systems. Similarly, in some embodiments, one or more of the computer systems illustrated in FIG. 1 may include several separate computer subsystems.

As illustrated in FIG. 1, the employee computer systems 110 generally comprise a communication device 111, a processing device 112, and a memory device 113. The processing device 112 is operatively coupled to the communication device 111 and the memory device 113. The processing device 112 uses the communication device 111 to communicate with the network 102. As such, the communication device 111 generally comprises a modem, server, or other device(s) for communicating with other devices on the network 102, and a display, mouse, keyboard, microphone, and/or speakers for communicating with one or more users, which include bank employees 101. As further illustrated in FIG. 1, the employee computer systems 110 include computer-executable program code 114 stored in the memory device 113, which include the computer-readable instructions 114 of the browser application 115. The browser application 115 allows the bank employee 101 to use the network 102 to connect to the customer's accounts and associated data located on the bank computer systems 130. The memory device 113 also includes one or more datastores 117 that store information.

In the illustrated embodiment, the bank computer systems 130 are operatively coupled to the employee computer systems 110, the Mortgage Plan server 120, and the customer computer systems 140, through the network 102. The bank computer systems 130 maintain the accounts of and services used by the bank's customers. A bank employee 101 may access the bank computer systems 130 through the network 102. The bank computer systems 130 generally include a communication device 131, a processing device 132, and a memory device 133. The processing device 132 is operatively coupled to the communication device 131 and the memory device 133. The processing device 132 uses the communication device 131 to communicate with the employee computer systems 110 and the Mortgage Plan server 120 through the network 102. As such, the communication device 131 generally comprises a modem, server, or other device(s) for communicating with other devices on the network 102.

As further illustrated in FIG. 1, the bank computer systems 130 contain computer-executable program code 134 stored in the memory device 133, which include the computer-executable program code 134 for a customer account application 135 through which bank employees 101 can access and manage customers' accounts. The memory device 133 also includes one or more datastores 137 that store information about the accounts and associated data of the bank's customers.

Although FIG. 1 illustrates the bank computer systems 130 as one system, it is important to note that there can be one or multiple systems, each with similar components that control the bank's accounts and services for all of the bank's customers. Furthermore, although FIG. 1 illustrates the bank computer systems 130 as separate from the Mortgage Plan server 120, in other embodiments the Mortgage Plan server 120 may be a part of the bank computer systems 130 and may be combined with servers or other computer systems that perform other functions.

In the illustrated embodiment, the Mortgage Plan server 120 is operatively coupled to the employee computer systems 110, the bank computer systems 130, and the customer computer systems 140, through the network 102. The Mortgage Plan server 120 generally includes a communication device 121, a processing device 122, and a memory device 123. The processing device 122 is operatively coupled to the communication device 121 and the memory device 123. The processing device 122 uses the communication device 121 to communicate with the network 102. As such, the communication device 121 generally includes a modem, server, or other device(s) for communicating with other devices on the network 102. As further illustrated in FIG. 1, the Mortgage Plan server 120 contains computer-executable program code 124 stored in the memory device 123, which includes the computer-executable program code 124 for a Mortgage Plan application 125 to electronically store and manage the information about the mortgage schedule and terms of the customer's Mortgage Plan. Although FIG. 1 illustrates the Mortgage Plan server 120 as one system, it is important to note that there can be one or multiple servers, each with similar components that electronically store and manage the content of the customers' Mortgage Plans. The memory device 123 also includes one or more datastores 127 that contain information about the customers' accounts and Mortgage Plans.

Furthermore, a customer 103 may use customer computer systems 140 to log into the bank computer systems 130 over the network 102, such as the Internet, to view her accounts, such as her Mortgage Plan, remotely in much the same way as the bank employee 101 may view the customer's 103 accounts.

As described briefly above, in one embodiment of the invention, the Mortgage Plan is a modification to an existing HELOC in which the existing loan amount is split into two portions: a Deferred Principal portion and a HELOC Principal portion. However, it shall be understood that, in other embodiments of the invention, the Mortgage Plan is applied to other types of loans associated with an asset, including but not limited to Home Equity Loans (HELOANs), first mortgages, second mortgages, and the like. As the terms are used herein, funds drawn from a "line of credit" are viewed as a type of "loan."

Under the Mortgage Plan, each portion is subject to different terms. A qualifying customer 103 can defer the obligation to pay interest on a portion of the customer's HELOC in exchange for sharing the future appreciation in the real property that serves as the underlying security for the HELOC. In one embodiment of the Mortgage Plan, a customer 103 will not have to pay more than he or she would have paid prior to entering into the Mortgage Plan. Thus, it can provide and incentive for the customer 103 to enter into the Plan. Additionally, it can allow the bank to mitigate their potential losses by either receiving what they originally would have on the loan or an amount above the current market value if the house appreciates. If any loss does occur, the loss would be deferred until the time at which the house was sold or the end of the original HELOC.

In some embodiments, the bank determines if the customer 103, which is generally the homeowner, qualifies for the Mortgage Plan before the terms of the Plan may be decided. In some embodiments the customer 103 may call the bank employee 101 to inquire about the Mortgage Plan, or on the other hand, the bank employee 101 may seek out potential customers for the Plan. Either way the bank employee 101 determines if the potential customer 103 qualifies by going through a number of questions, which, alone or in combination, may indicate that the customer 103 qualifies for the Mortgage Plan.

To implement the Mortgage Plan, in one embodiment of the invention the bank first identifies customers 103 that have the ability to pay, but could choose to not meet the contract terms of the mortgage due to a negative equity position. Furthermore, in some embodiments, in order to qualify for a Mortgage Plan, customers' homes should be in housing markets that are likely to appreciate a specified percentage over several years. In some embodiments, this percentage may be 10% over the span of 5 years, but it could be any amount over the life of the mortgage.

Figure 2:
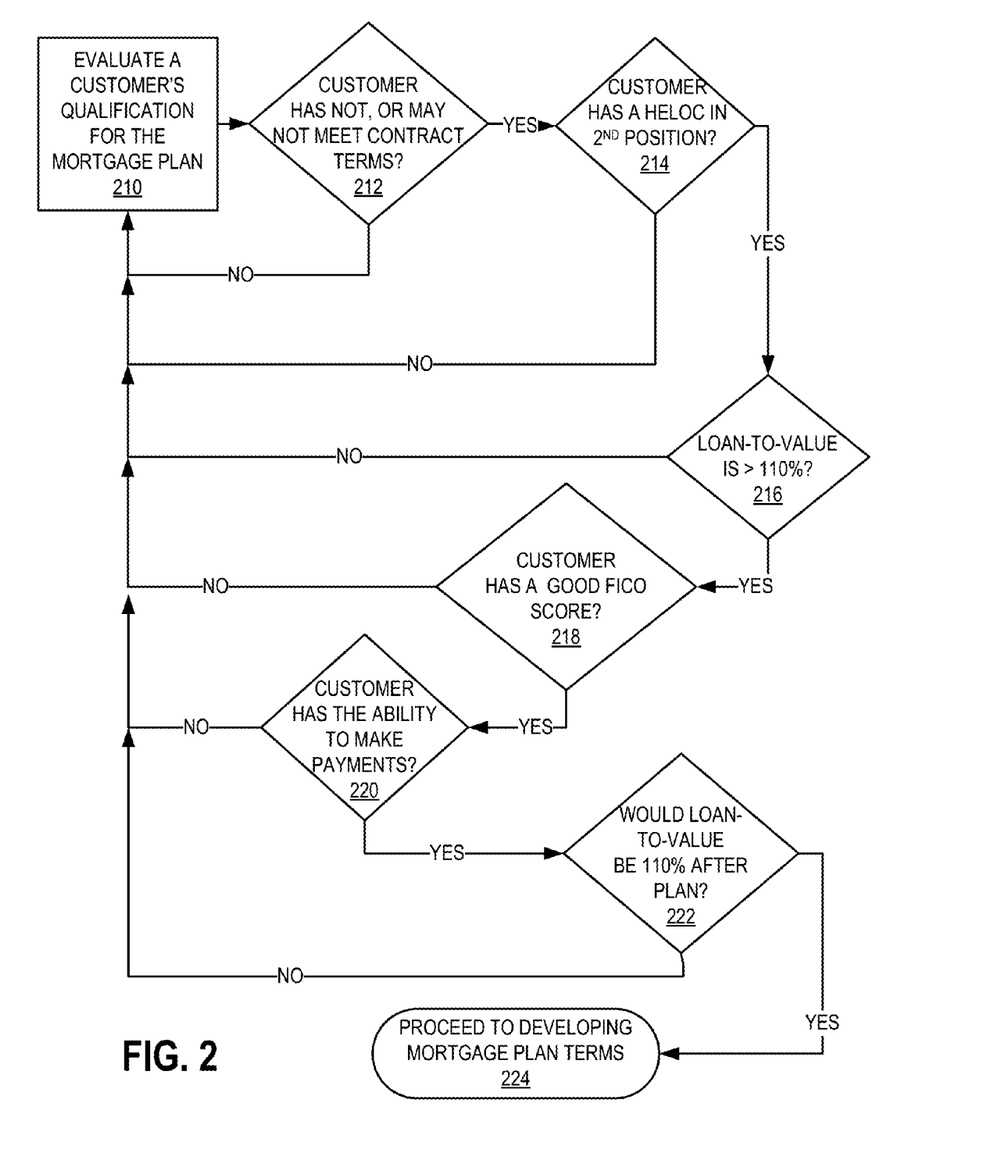
FIG. 2 provides a flow chart illustrating a process of how customers are identified for the Mortgage Plan, in accordance with one embodiment of the present invention.

In one embodiment, in order to identify a customer 103 for the Plan, a bank employee 101 may enter specific parameters discussed below into the browser application 115 of the employee computer system 110. The employee computer system 110 searches stored information in the Mortgage Plan server 120 and bank computer systems 130 for customers 103 that meet the specific parameters. FIG. 2 illustrates a flow chart of one embodiment indicating how the bank employee 101 and employee computer systems 110 identify customers 103 who are qualified for the Mortgage Plan. For example, in some embodiments of the invention, there are a number of requirements a customer 103 may have to meet before acceptance into the Plan.

As illustrated by block 210 in FIG. 2, a bank employee 101 may use the employee computer system 110 to search the bank computer systems 120 for potential customers 103. It should be appreciated that, in other embodiments of the invention, one or more of the tasks described herein as being handled by a bank employee 101 may be handled automatically by a computer system, such as the employee computer system 110, the bank computer system 130 or the mortgage plan server 120, or by other agents of the bank or other financial institutions.

As illustrated by decision diamond 212 in FIG. 2, in one embodiment, the bank employee 101 looks for customers 103 who may fail to meet the contract terms of the mortgage or have already failed to meet the contract terms of their loans. The failure to meet the contract terms of the mortgage could be a missed payment on a mortgage, a number of missed payments on mortgages over a specified time period, or some other metric related to the failure to meet the contract terms of the mortgage. In the illustrated embodiment, if the customer has failed to meet the contract terms of the mortgage, the bank employee 101 then looks to see if the customer's HELOC is in the second lien position, as illustrated by decision diamond 214. In some embodiments of the invention, the bank may not require that the HELOC be in the second lien position. In still other embodiments of the invention, the HELOC may be another type of loan in another repayment position.

In the illustrated embodiment, if the customer's HELOC is in the second lien position, the bank employee 101 will then determine whether the customer's loan-to-value ratio is greater than some predefined percentage, such as, for example, a value of 110%, as illustrated by decision diamond 216. The loan-to-value ("LTV") ratio is the amount of debt as a percentage of the total market value of the property. The LTV could be calculated as a single mortgage debt or a cumulative LTV, sometimes referred to CLTV, which includes one or more mortgages, liens, or other debts on the house. As LTV is used throughout this application, CLTV or other value ratios may instead be used when discussing the LTV. In the exemplary embodiment described herein where the loan subject to the Mortgage Plan is a HELOC, the LTV ratio is a CLTV since the value of the HELOC is combined with the value of the first mortgage and any other mortgages or home equity loans in order to get a complete picture of the total amount borrowed against the house compared to the house's value. In other embodiments of the invention the bank employee 101 will also make sure the customer's loan-to-value ratio is no greater than some other maximum percentage, such as, for example, a value of 125%. It should be appreciated that, in other embodiments of the invention, other percentages outside a LTV ratio of 110% could be used to determine if the customer 103 is qualified for the Mortgage Plan. For example, in other embodiments, the bank's test for determining if customers qualify for the Mortgage Plan could be if the customers have a CLTV greater than, for example, 100%, 105%, 115%, or 120%.

In one embodiment of the invention, the bank will hire an appraiser to evaluate the market value of the property when determining the LTV. In other embodiments of the invention the bank will calculate the market value based on older appraised values of the home as they now relate to the new market conditions at the time of the LTV ratio calculation. In some embodiments, the current market value will be calculated by one of the computer systems in an automated fashion, commonly referred to as an Automated Valuation Model (AVM). AVMs use known algorithms and recent comparable sales to determine estimated current market values for a property.

If the customer's LTV ratio meets the required LTV ratio then the bank employee 101 will evaluate whether the customer 103 has an acceptable financial commitment rating, as illustrated by decision diamond 218. In one embodiment, an acceptable financial commitment rating may be a financial commitment rating as determined by the Fair Isaac Corporation that is greater than a specific value. In other embodiments of the invention, the financial commitment rating as determined by the Fair Isaac Corporation could be higher or lower or a different scoring agency or system could be used to calculate the financial commitment rating.

After the bank employee 101 determines that the customer 103 has the proper financial commitment rating, the bank employee 101 will determine the customer's ability to make the remaining mortgage payments after the Mortgage Plan is implemented, as illustrated in decision diamond 220. The process could include the calculation of the customer's maximum housing expense ratio. For example, in one embodiment of the invention, a ratio over 35% would exclude the customer 103 from participation in the Mortgage Plan. In other embodiments of the invention, different ratios could be used, or other metrics altogether could be used to determine if the customer would be able to make the restructured payment under the Mortgage Plan. In some embodiments of the invention, the metric used to calculate the customer's ability to make the restructured mortgage payments is a cash flow analysis of the customer's finances.

Thereafter, as illustrated by decision diamond 222, the bank employee 101 determines if a deferral of up to a certain portion of the loan will allow the customer to reach a new LTV ratio of 110% or other predefined percentage. In one embodiment of the invention, the bank employee 101 must make sure that the LTV ratio of 110% will result after a deferral of up to 50% in the HELOC. In other embodiments of the invention, other post modification LTV ratios or HELOC percentage reductions could be used to determine the customer's qualification for the Mortgage Plan.

There are a number of additional factors not outlined in FIG. 2, which in some embodiments could affect the customer's qualification for the Mortgage Plan. In some embodiments, the property must be the customer's 103 primary residence. Although, in other embodiments the property may be an investment property. In some embodiments, the customer 103 must also submit full financial information to the bank and meet the bank's financial commitment rating and collateral requirements. In some embodiments of the invention the first mortgage on the home may not be of a certain type, such as a no pay-option ARM, or interest only mortgage, etc.

In some embodiments, the requirements discussed herein all need to be met before a customer qualifies for the Mortgage Plan. However, in other embodiments of the invention, only some of these requirements are to be met for qualification. In still other embodiments if the invention, some or all of the requirements discussed may not be required and other financial indicators or metrics may be used to determine if a customer 103 is qualified for the Mortgage Plan. For example, in some embodiments, potential customers are identified using other procedures, such as identifying all qualifying loans (e.g., HELOCs in the second position) that the bank has for their customers, and then comparing the CLTV ratio to past appraisals and local market data to identify potential negative equity situations.

Figure 3:
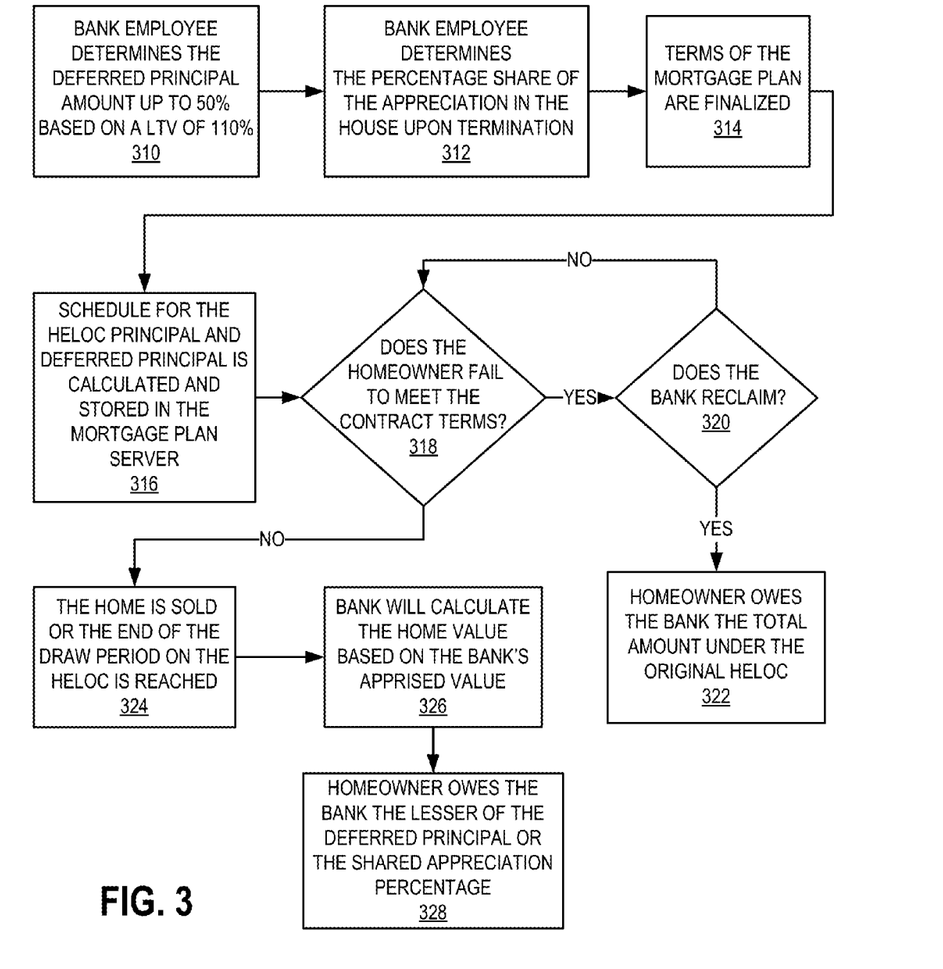
FIG. 3 provides a flow chart illustrating a process covering implementation through termination of a Mortgage Plan, in accordance with one embodiment of the invention.

After the bank employee 101 determines that the customer is qualified for the Mortgage Plan, as illustrated by termination block 224, the terms of the agreement between the bank and the customer 103 are determined. FIG. 3, illustrates the Mortgage Plan process from implementation through termination, in accordance with one embodiment of the invention. As illustrated in block 310, the bank employee (or, as described above, a computerized apparatus, or other agent of the bank) determines the deferred principal amount. The bank may defer up to a certain percentage of the balance owed on the HELOC ("the Deferred Principal"). In one embodiment this percentage may be up to 50% of the HELOC. In some embodiments of the invention, the Deferred Principal amount will be the amount of money necessary to produce a CLTV (first mortgage and HELOC principal) ratio of 110% (or some other predefined percentage) after the modification is made. In one embodiment, the Deferred Principal amount will be the amount of money necessary to produce a CLTV ratio of 110% after the modification is made up to 50% of the amount owed on the HELOC. In one embodiment, the Deferred Principal amount will be the amount of money necessary to product a CLTV ratio of between a certain range, such as 110%-125%, up to 50% of the amount owned on the HELOC.

In one embodiment of the invention, a period of deferment will be set. Therefore, in some embodiments, the Mortgage Plan terminates at the earlier of the end of the deferment period, sale of the property, or some other termination event. In one embodiment, where the loan subject to the modification is a HELOC, the period of deferment will be either the remaining term of the original ten (10) year draw period of the HELOC, or until the sale of the underlining real property to a third party, whichever is shorter. However, in other embodiments, the length of the deferment term may vary over the length of the loan and in some cases may extend past the length of the loan.

The remaining percentage of the balance owed under the HELOC ("the HELOC Principal"), in some embodiments, is subject to the original terms (e.g., interest terms) of the HELOC. In some embodiments of the invention, the customer 103 may only be obligated to pay interest during the draw period, and then principal and interest thereafter during the repayment period.

In some embodiments of the invention, the Deferred Principal is set up as a Fixed Rate Loan ("FRLO"), but in other embodiments it may be set up as another type of loan. No payments will be due on the Deferred Principal, as long as the customer 103 honors the obligations of the original HELOC agreement with respect to the HELOC Principal. However, the underlying real property will continue to secure the Deferred Principal. In other embodiments of the invention, the customer may be required to make reduced payments of interest and/or principal on the Deferred Principal.

After the Deferred Principal amount is determined, the bank employee 101 will calculate the shared appreciation percentage, as illustrated by block 312. In one embodiment of the invention the shared appreciation amount is 50% of the value of the home at the time of termination of the Mortgage Plan. In some embodiments of the invention the 50% is calculated after certain capital improvements are subtracted from the appreciation. In other embodiments of the invention the shared appreciation percentage could be determined through negotiations between the bank and the customer 103.

After the shared appreciation percentage is calculated the remaining terms of the Mortgage Plan are finalized, as illustrated in block 314. In one embodiment, the Mortgage Plan also restricts the customer 103 to a minimum term of twelve (12) months after entering the Mortgage Plan before the deferral can end through a sale of the property. In other embodiments of the invention, the restriction period may be greater than twelve months, may vary based on certain metrics, or removed altogether. In other embodiments of the invention the customer 103 agrees not to take additional draws on the HELOC until the Deferred Balance is repaid.

After the terms of the Mortgage Plan are finalized, the schedule for the HELOC Principal and a schedule for the deferred interest on the Deferred Balance will be calculated using the Mortgage Plan application 125 and stored in the memory device 123 of the Mortgage Plan server 120. In some embodiments of the invention, the bank employee 101 enters in the specifics of the customer's financials, such as the first mortgage price, the HELOC value, the market value of the home as determined by the bank, the remaining term of the mortgage, etc. into the Mortgage Plan application 125 and the computer will determine the terms and schedule of the Mortgage Plan. Furthermore, the Mortgage Plan may be monitored by the bank employee 101 through the employee computer systems 110 in order to determine that the customer 103 is complying with all the terms of the Mortgage Plan. The schedule may also be viewed by the customer 103 through the use of a customer computer system 140, which the customer would typically use to remotely view the customer's bank accounts.

The bank employee 101 may track the payments made by the customer through the mortgage plan application 125. As illustrated by decision diamond 318, there are two courses of action that may occur based on whether the customer 103 fails to meet the contract terms of the mortgage. In some embodiments of the invention, if the customer 103 fails to meet the contract terms on the HELOC Principal amount after entering the Mortgage Plan, by, for example, not making the required payments, breaking the terms of the Mortgage Plan, refinancing, failing to pay the shared appreciation or the deferred balance, selling the home during the twelve-month restriction period, etc., then the bank is entitled to full repayment under the original HELOC terms. As illustrated by decision diamond 320, the bank at its discretion may reclaim the residence, or may decide to let the customer 103 remedy the failure to meet the contract terms on the mortgage, etc. In the case of reclaiming the residence, as illustrated by block 322, the bank is entitled to the HELOC Principal and its interest as well as the Deferred Principal and its accumulated interest as defined by the original terms of the HELOC. In other embodiments of the invention, the bank is entitled to whatever was agreed to by the bank and the customer 103 when determining the terms of the Mortgage Plan. In the case where the customer 103 remedies the failure to meet the contract terms of the mortgage, the bank is still entitled to a shared appreciation percentage of the underlying real property as defined in the Mortgage Plan, and the customer 103 continues to make payments.

If the contract terms of the mortgage are met, then the Mortgage Plan ends at either the end of the ten-year draw period or at the sale of the underlying real property, whichever occurs first, as illustrated in block 324. At the end of the Mortgage Plan, the bank again determines the value of the property, as illustrated by block 326. In some embodiments, the bank uses the sale price as the valuation. In other embodiments the bank appraises the value of the home using, for example, the same valuation method that was used when entering into the Mortgage Plan. In still other embodiments, the bank may use a completely different valuation method than that which was previously used. The valuation methods may be laid out in the Mortgage Plan terms.

As illustrated in block 328, the customer 103 owes the bank either the Deferred Principal or the shared appreciation percentage indicated in the Mortgage Plan, whichever is less. Again, in some embodiments the percentage may be up-to fifty percent (50%), but it could be any agreed upon percentage. The percentage is calculated from the amount by which the value of the real property increased from the initial valuation determined before entering into the Mortgage Plan. In some embodiments of the invention, the value of the shared appreciation may be reduced by certain capital improvements on the property as agreed upon in the Mortgage Plan. As an alternative to paying the bank the agreed-upon share of the appreciation of the underlying property, the customer 103 can pay to the bank the Deferred Principal if it is less than the bank's share of the appreciation. In some cases, the deferred interest payments are included in the Deferred Principal amount repaid by the customer 103.

Figure 4:
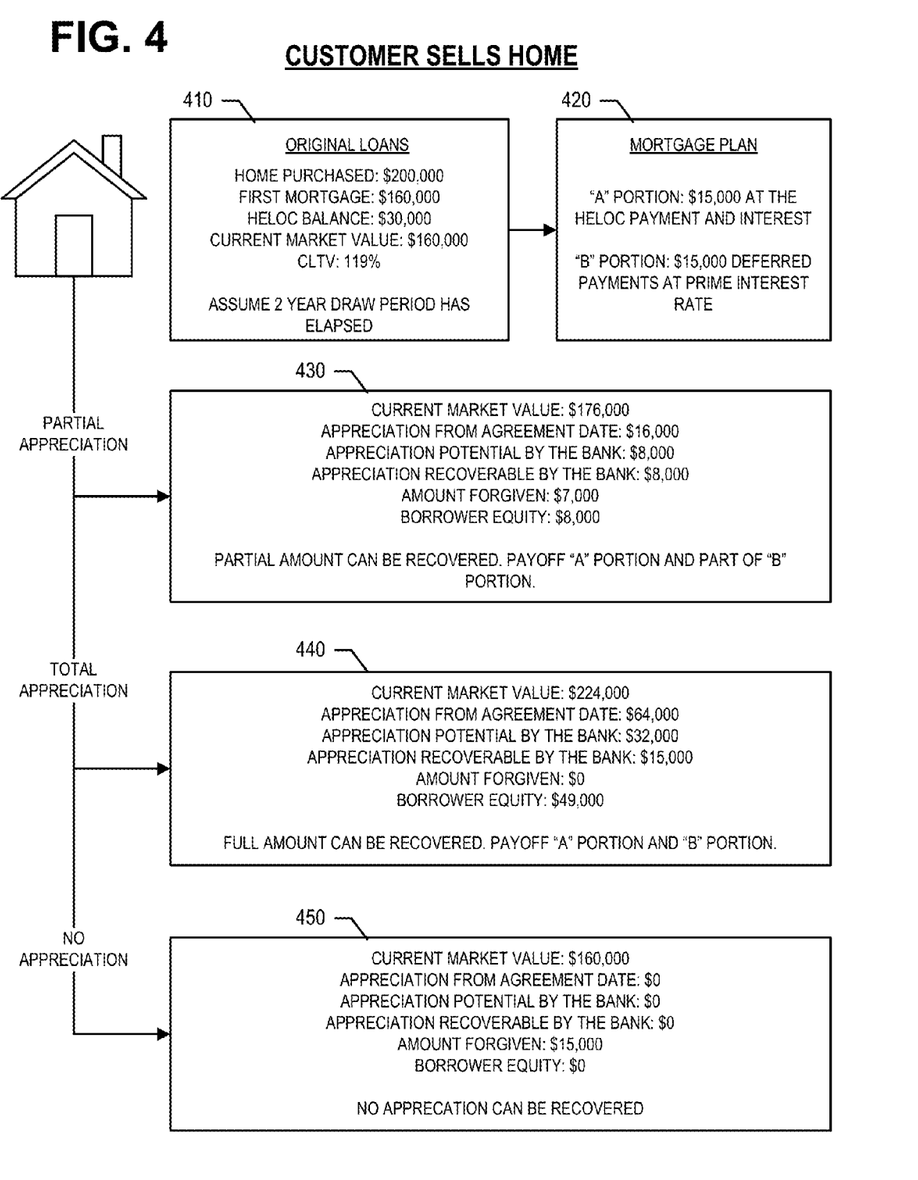
FIG. 4 provides examples of the Mortgage Plan and repayment options available for customers if the customer sells the home, in accordance with one embodiment of the invention.

FIG. 4 illustrates one embodiment of the invention that provides examples of the Mortgage Plan and repayment options available for customers when the customer sells the home. For example, as illustrated by block 410, a customer 103 may have purchased a residence for $200,000 using a first mortgage. In this example, the current balance of the fist mortgage is $160,000 and the customer has a current HELOC balance of $30,000. However, due to declines in the housing market, the residence is currently estimated to be worth only $160,000. Since the CLTV is 119% (e.g., (160,000+30,000)/160,000=119%) and greater than the pre-defined 110% CLTV requirement, and assuming the customer 103 met any other requirements, the bank offers the customer 103 the shared appreciation Mortgage Plan. As represented by block 420, under the Mortgage Plan the bank splits the $30,000 HELOC balance into two portions: (1) a $15,000 HELOC Principal portion (the "A" Portion), and (2) a $15,000 Deferred Principal portion (the "B" Portion). The customer 103 makes principal and interest payments on the "A" Portion and the payments on the "B" Portion are deferred.

If the customer 103 does meet the contract terms of the mortgage, such as makes all the payments over time, three scenarios exist when the customer 103 makes a valid sale of the home: (1) partial appreciation, (2) total appreciation, or (3) no appreciation. Block 430 illustrates an example of a partial appreciation scenario where the current market value of the home, when sold, is $176,000. In such an example, the sale of the home results in $16,000 of appreciation from the point the Mortgage Plan was implemented (176,000 -160,000=16,000). Therefore, the bank and the customer 103 are both entitled to $8,000 appreciation due to the 50% interest the bank took in the appreciation of the property in exchange for deferring $15,000 of the HELOC balance. In this example, the bank effectively forgave $7,000 of the $15,000 that the customer owed to the bank in Deferred Principal.

Block 440 illustrates an example of a total appreciation scenario where the current market value of the home at the time of the sale is $224,000, resulting in $64,000 of appreciation from the point the Mortgage Plan was implemented. The appreciation potential by the bank is $32,000, because that is 50% of the total appreciation. However, the amount recoverable by the bank is only the $15,000 of the "B" Portion, because it is less than the potential appreciation. The amount forgiven is thus $0, and the borrower equity is the total appreciation minus the "B" Portion, which, in this example, is $49,000.

Block 450 illustrates an example of a no appreciation scenario where the current market value of the home when it is sold is still only $160,000, resulting in no appreciation from the point the Mortgage Plan was implemented. The appreciation recovered by the bank and customer 103 is thus $0, and the amount forgiven is the total $15,000 of the "B" Portion.

Figure 5:
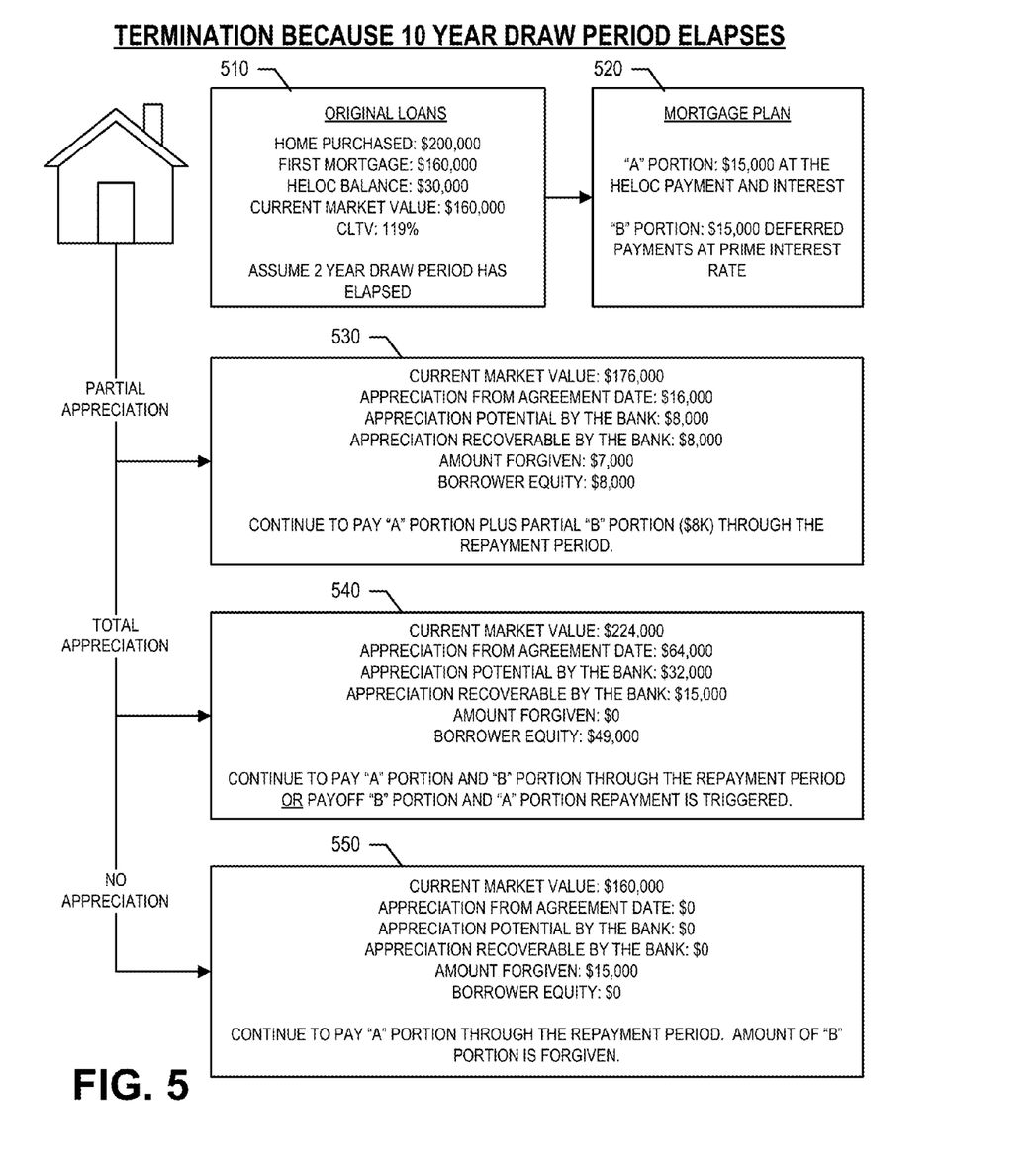
FIG. 5 provides examples of the Mortgage Plan and repayment options available for customers if the draw period elapses.

FIG. 5 illustrates one embodiment of invention that provides examples of the Mortgage Plan and repayment options available for customers when the draw period elapses. As illustrated by blocks 510 and 520, the numbers used for these examples are the same as the numbers used in the examples of FIG. 4, however instead of selling the house the draw period on the equity line of credit elapses resulting in termination of the Mortgage Plan. For example, if two (2) years had passed on the draw period when entering the Mortgage Plan, when the draw period elapses after another eight (8) years, the Mortgage Plan will end. As represented by block 530, in the partial appreciation scenario, the customer 103 continues to pay the A Portion plus the partial amount of the "B" Portion not forgiven (i.e. $8,000) or the customer 103 can payoff the partial amount of the "B" Portion not forgiven (i.e. $8,000) and the "A" Portion repayment period is triggered (principal plus interest). As represented by block 540, in the total appreciation scenario the customer 103 can continue to pay the "A" Portion plus the "B" Portion through the repayment period or the customer 103 can pay off the "B" Portion and the "A" Portion repayment period is triggered. As represented by block 550, in the no appreciation scenario the customer 103 continues to pay the "A" Portion through the repayment period, however, the amount of the "B" Portion is forgiven (i.e. $15,000). The amount of the "B" Portion forgiven may be considered to be a gift, income, or capital gains, so as previously indicated, any portion forgiven by the bank may have tax implications that the customer 103 should review with tax advisers.

Figure 6:
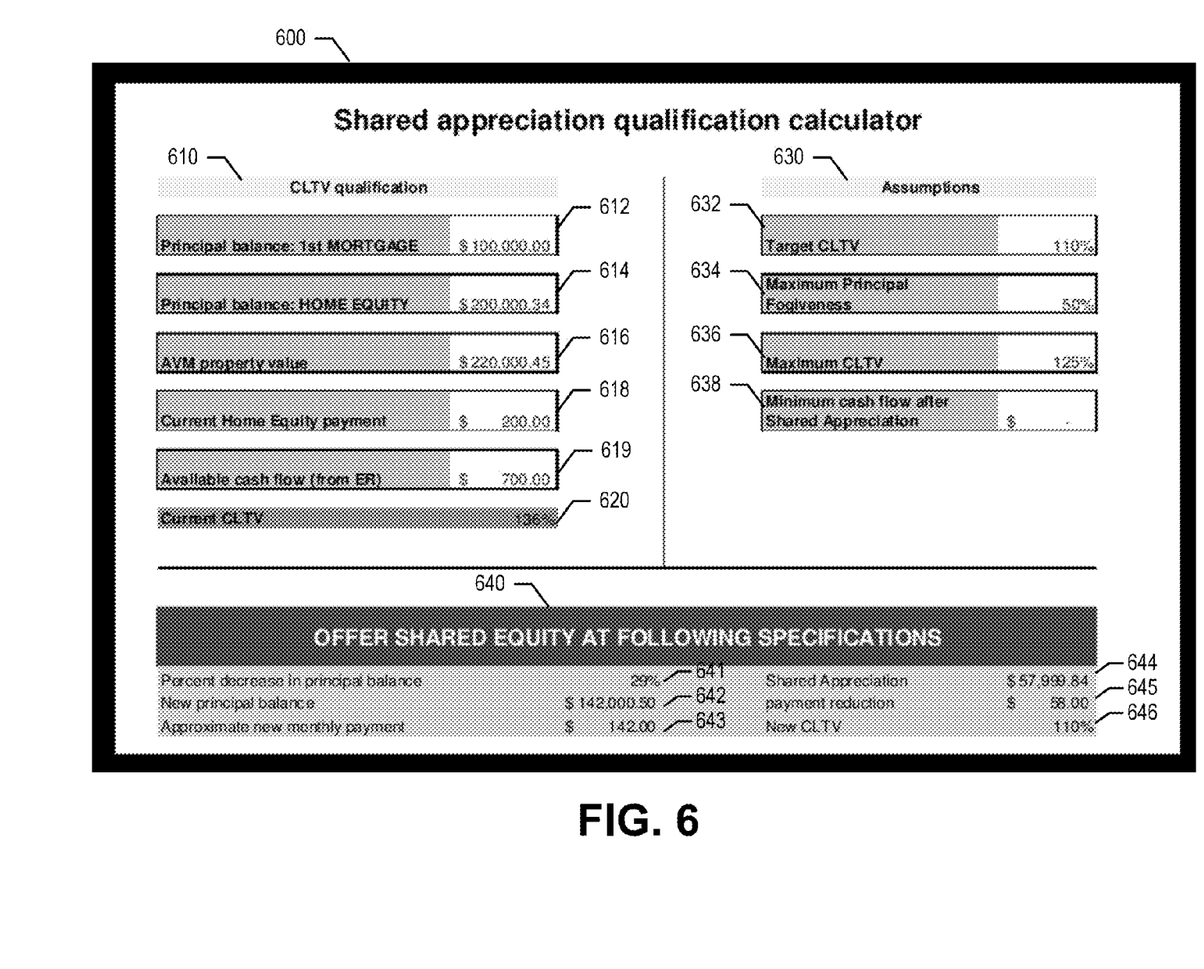
FIG. 6 illustrates an example of a graphical user interface of a Mortgage Plan calculator tool, in accordance with an embodiment of the invention.

FIG. 6 illustrates an example of a graphical user interface 600 for a Mortgage Plan calculator tool, in accordance with an embodiment of the invention. In one embodiment of the invention, the employee computer system 110 and/or the mortgage plan server 120 include computer-executable program code stored in their memory devices for providing the bank employee 101 with a Mortgage Plan calculator tool that allows the bank employee 101 to input certain information about a customer to determine whether the customer qualifies for a shared appreciation loan medication and, if so, the terms that can be offered for such a modification. In one embodiment, the computer-executable program code displays the graphical user interface 600 to the bank employee 101 using a display device of the employee computer system 110.

As illustrated in FIG. 6, the graphical user interface 600 prompts the bank employee 101 to enter a plurality of inputs 610 about the customer 103 and the customer's property, displays a plurality of assumptions 630 used for the example shared appreciation Mortgage Plan, and displays a plurality of outputs 640 about the terms of the shared appreciation Mortgage Plan, if any, that can be offered to this particular customer 103 for this particular property. Specifically, the interface 600 allows the bank employee 101 to enter the first mortgage principal balance 612 (here $100,000), the HELOC principal balance 614 (here $200,00.34), the AVM property value 616 (here $220,000.45), the current HELOC payment 618 (here $200), and the customer's available cash flow 619 (here $700). From these inputs, the calculator tool computes the CLTV 620 by summing the balances of the first mortgage and the HELOC and dividing it by the property value. In this example, the CLTV 620 is 136% (i.e., (100,000+200,000.34)/220,000.45 = 136%). The assumptions used in this example of the Mortgage Plan include a target CLTV 632 of 110%, a maximum principal forgiveness 634 of 50%, a maximum CLTV 636 of 125%, and a minimum cash flow after the Mortgage Plan 638 of zero. Using these inputs and the assumptions, the processor of the computer system hosting the calculator tool calculates where the user will qualify for a shared appreciation Mortgage Plan and, if so, what the terms will be. It does so by trying to obtain a CLTV as close to 110% as possible without exceeding 125%, without forgiving more than 50% of the HELOC principal, and without leaving the customer with below any specified minimum cash flow amount (here zero). Is this case, as shown by the outputs 640, a new CLTV 646 of 110% is able to be reached by deferring 29% of the HELOC's principal balance 641 and, thereby, creating a new HELOC principal balance 642 of $142,000.50. By deferring this portion of the old HELOC principal, the customer's payment 643 on the HELOC would be reduced by $58 per month 645, from $200 per month to $142 per month. In return, the bank will share in any appreciation in the home between now and termination of the Mortgage Plan up to a maximum amount of $57,999.84 (i.e., the deferred HELOC principal 644).

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A loan modification system comprising: a memory system comprising information stored therein about a loan on a residence, wherein the loan comprises a principal balance and payment terms, and wherein the loan is an original HELOC loan on the residence; and a processing system operatively coupled to the memory system and configured calculate a modified loan payment schedule for a customer based on a loan modification plan and store the modified loan payment schedule in the memory system, wherein the loan modification plan comprises: modifying the original HELOC loan on the residence, wherein modifying the original HELOC comprises: creating new contract terms for the original HELOC loan by dividing the loan balance of the original HELOC loan into a first loan portion and a second loan portion, wherein the first loan portion is subject to payment terms of the original HELOC loan, and wherein payment on the second loan portion is deferred until termination of the new contract terms for the first loan portion of the original HELOC loan, wherein termination occurs at the sale of the residence; receiving, at termination of the loan modification plan, a portion of appreciation of a total appreciation that occurs from a first value of the residence at a first time proximate establishment of the loan modification plan to a second value of the residence at a second time proximate termination of the loan modification plan and forgoing the second loan portion when the portion of appreciation is less than the second loan portion; receiving, at the termination of the loan modification plan, the second loan portion and forgoing the portion of appreciation when the portion of appreciation is greater than the second loan portion; and forgoing, at the termination of the loan modification plan, the second loan portion when the first value of the residence at the first time proximate establishment of the loan modification plan is greater than the second value of the residence at the second time proximate termination of the loan modification plan.

2. The loan modification system of claim 1, wherein the processing system is further configured to allow a user to input requirements to determine an eligibility of the customer for the loan modification plan, wherein the requirements comprise that the customer has acted in a way that will allow the mortgagee to reclaim the residence or the customer is already non-conforming to original terms.

3. The loan modification system of claim 1, wherein the processing system is further configured to allow a user to input requirements to determine an eligibility of the customer for the loan modification plan, wherein the requirements comprise that the customer's total outstanding loans on a residence are greater than the value of the residence before entering the loan modification plan.

4. The loan modification system of claim 3, wherein a ratio of the customer's total outstanding loans on a residence to the value of the residence before entering the loan modification plan is greater than one-hundred and ten percent.

5. The loan modification system of claim 1, wherein the processing system is further configured to allow a user to input requirements to determine an eligibility of the customer for the loan modification plan, wherein the requirements comprise that the customer has an ability to make payments on the loan.

6. The loan modification system of claim 1, wherein the processing system is further configured to allow a user to input requirements to determine the eligibility of the customer for the loan modification plan, wherein the requirements comprise that the customer's loan-to-value ratio will meet a targeted ratio or range of ratios after entering the loan modification plan.

7. The loan modification system of claim 6, wherein the customer's loan-to-value ratio is equal to one-hundred and ten percent after entering the loan modification plan.

8. The loan modification system of claim 1, wherein the second loan potion is not greater than fifty percent of the loan.

9. The loan modification system of claim 1, wherein a percentage of the appreciation in the value of the residence that the mortgagee is entitled to is fifty percent of the difference between the value of the residence at the time of termination minus the value of the residence at the time when the customer entered into the loan modification plan.

10. The loan modification system of claim 1, wherein the loan modification plan further comprises that the customer elects to pay the mortgagee the lesser amount of the either a percentage of the portion appreciation in the value of the residence or the second loan portion of the loan.

11. The loan modification system of claim 1, wherein the loan modification plan further comprises that the mortgagee determines the value of the residence when the loan modification plan is entered into by the customer and when termination of the loan modification plan occurs under the same valuation process.

12. The loan modification system of claim 1, wherein the loan modification plan further comprises that if the customer does not meet the terms on any loan associated with the residence, then the customer owes the mortgagee both the first portion and the section portion of the loan subject to the payment terms of the loan.

13. A method for a loan modification plan, wherein the loan modification plan is for a loan that is an original HELOC loan on a residence, the method comprising: creating, through the use of a processor, the terms of the loan modification plan, wherein the terms comprise: modifying the original HELOC loan on the residence, wherein modifying the original HELOC comprises: creating new contract terms for the original HELOC loan by dividing the loan balance of the original HELOC loan into a first loan portion, wherein the first loan portion is subject to original terms of the original HELOC loan, and a second loan portion of the existing loan, wherein payments are deferred on the second loan portion until termination of the new contract terms for the first loan portion of the original HELOC loan, wherein termination occurs at the sale of the residence; an agreement to receive, at termination of the loan modification plan, a portion of appreciation of a total appreciation that occurs from a first value of a residence at a first time proximate establishment of the loan modification plan to a second value of the residence at a second time proximate termination of the loan modification plan and forgo the second loan portion when the portion of appreciation is less than the second loan portion; an agreement to receive, at the termination of the loan modification plan, the second loan portion and forgo the portion of appreciation when the portion of appreciation is greater than the second loan portion; and an agreement to forgo, at the termination of the loan modification plan, the second loan portion when the first value of the residence at the first time proximate establishment of the loan modification plan is greater than the second value of the residence at the second time proximate termination of the loan modification plan; calculating, through the use of the processor, the loan modification plan payment schedule; storing, through the use of the processor, the terms and the payment schedule of the loan modification plan.

14. The method of claim 13, further comprising: receiving, through the use of a processor, customer eligibility requirements for the loan modification plan, wherein the requirements comprise that the customer has acted in a way that will allow the mortgagee to reclaim the residence or the customer is already non-conforming to original terms.

15. The method of claim 13, further comprising: receiving, through the use of a processor, customer eligibility requirements for the loan modification plan, wherein the requirements comprise that the customer's total outstanding loans on a residence are greater than the value of the residence before entering the loan modification plan.

16. The method of claim 15, wherein a ratio of the customer's total outstanding loans on a residence to the value of the residence before entering the loan modification plan is greater than one-hundred and ten percent.

17. The method of claim 13, further comprising: receiving, through the use of a processor, customer eligibility requirements for the loan modification plan, wherein the requirements comprise that the customer has an ability to make payments on the loan, but is unwilling to do so.

18. The method of claim 13, further comprising: receiving, through the use of a processor, customer eligibility requirements for the loan modification plan, wherein the requirements comprise that the customer's loan-to-value ratio will meet a targeted ratio or range of ratios after entering the loan modification plan.

19. The method of claim 18, wherein the customer's loan-to-value ratio is equal to one-hundred and ten percent after entering the loan modification plan.

20. The method of claim 13, wherein the second potion of the loan is not greater than fifty percent of the loan.

21. The method of claim 13, wherein the percentage of future appreciation in the value of the residence that the mortgagee is entitled to is fifty percent of the difference between the value of the residence at the time of termination minus the value of the residence at the time when the customer entered into the loan modification plan.

22. The method of claim 13, wherein the terms of the loan modification plan further comprise that the customer elects to pay the mortgagee the lesser amount of the either the percentage of future appreciation in the value of the residence or the second loan portion of the loan.

23. The method of claim 13, wherein the terms of the loan modification plan further comprise that the mortgagee determines the value of the residence when the loan modification plan is entered into by the customer and when termination of the loan modification plan occurs under the same valuation process.

24. A computer program product comprising a computer-readable medium having computer-readable program code portions embodied therein, the computer-readable program code portions comprising: a first executable portion configured for creating terms of a loan modification plan, wherein the loan modification plan is for a loan that is an original HELOC loan on a residence, wherein the terms comprise; modifying the original HELOC loan on the residence, wherein modifying the original HELOC comprises: creating new contract terms for the original HELOC loan by dividing the loan balance of the original HELOC loan into a first loan portion, wherein the first loan portion is subject to original terms of the original HELOC loan, and; a second loan portion, wherein payments are deferred on the second loan portion, until termination of the new contract terms for the first loan portion of the original HELOC loan, wherein termination occurs at the sale of the residence; an agreement to receive, at termination of the loan modification plan, a portion of appreciation of a total appreciation that occurs from a first value of a residence at a first time proximate establishment of the loan modification plan to a second value of the residence at a second time proximate termination of the loan modification plan and forgo the second loan portion when the portion of appreciation is less than the second loan portion; an agreement to receive, at the termination of the loan modification plan, the second loan portion and forgo the portion of appreciation when the portion of appreciation is greater than the second loan portion; and an agreement to forgo, at the termination of the loan modification plan, the second loan portion when the first value of the residence at the first time proximate establishment of the loan modification plan is greater than the second value of the residence at the second time proximate termination of the loan modification plan; a second executable portion configured for calculating the loan modification plan payment schedule; and a third executable portion configured for storing the terms and the payment schedule of the loan modification plan.

25. The computer program product of claim 24, further comprising: an executable portion configured for receiving customer eligibility requirements for the loan modification plan, wherein the requirements comprise that the customer has acted in a way that will allow the mortgagee to reclaim the property or the customer is already non-conforming to original terms.

26. The computer program product of claim 24, further comprising: an executable portion configured for receiving customer eligibility requirements for the loan modification plan, wherein the requirements comprise that the customer's total outstanding loans on a residence are greater than the value of the residence before entering the loan modification plan.

27. The computer program product of claim 26, wherein a ratio of the customer's total outstanding loans on a residence to the value of the residence before entering the loan modification plan is greater than one-hundred and ten percent.

28. The computer program product of claim 24, further comprising: an executable portion configured for receiving customer eligibility requirements for the loan modification plan, wherein the requirements comprise that the customer has an ability to make payments on the loan, but is unwilling to do so.

29. The computer program product of claim 24, further comprising: an executable portion configured for receiving customer eligibility requirements for the loan modification plan, wherein the requirements comprise that the customer's loan-to-value ratio will meet a targeted ratio or range of ratios after entering the loan modification plan.

30. The computer program product of claim 29, wherein the customer's loan-to-value ratio is equal to one-hundred and ten percent after entering the loan modification plan.

31. The computer program product of claim 30, wherein the second potion of the loan is not greater than fifty percent of the loan.

32. The computer program product of claim 24, wherein the percentage of future appreciation in the value of the residence that the mortgagee is entitled to is fifty percent of the difference between the value of the residence at the time of termination minus the value of the residence at the time when the customer entered into the loan modification plan.

33. The computer program product of claim 24, wherein the terms of the loan modification plan further comprise that the customer elects to pay the mortgagee the lesser amount of the either the percentage of future appreciation in the value of the residence or the second loan portion of the loan.

34. The computer program product of claim 24, wherein the terms of the loan modification plan further comprise that the mortgagee determines the value of the residence when the loan modification plan is entered into by the customer and when termination of the loan modification plan occurs under the same valuation process.

35. The computer program product of claim 24, wherein the terms of the loan modification plan further comprise that if the customer fails to meet the terms on any loan associated with the residence the customer owes the mortgagee both the first portion and the section portion of the loan subject to the original terms of the loan.

36. An apparatus comprising: a memory device having computer readable program code store thereon; and a processing device operatively coupled to the memory device, and the communication device, wherein the processing device is configured to execute the computer readable program code to: create the terms of a loan modification plan, wherein the loan modification plan is for a loan that is an original HELOC loan on a residence, wherein the terms comprise; modifying the original HELOC loan on the residence, wherein modifying the original HELOC comprises: creating new contract terms for the original HELOC loan by dividing the loan balance of the original HELOC loan into a first loan portion of an existing loan on collateral, wherein the first loan portion is subject to original terms of the original HELOC loan, and existing loan; a second loan portion of the existing loan, wherein payments are deferred on the second loan portion until termination of the new contract terms for the first loan portion of the original HELOC loan, wherein termination occurs at the sale of the residence; an agreement to receive, at termination of the loan modification plan, a portion of appreciation of a total appreciation that occurs from a first value of the collateral at a first time proximate establishment of the loan modification plan to a second value of the collateral at a second time proximate termination of the loan modification plan and forgo the second loan portion when the portion of appreciation is less than the second loan portion; an agreement to receive, at the termination of the loan modification plan, the second loan portion and forgo the portion of appreciation when the portion of appreciation is greater than the second loan portion; and an agreement to forgo, at the termination of the loan modification plan, the second loan portion when the first value of the collateral at the first time proximate establishment of the loan modification plan is greater than the second value of the collateral at the second time proximate termination of the loan modification plan;

calculate the loan modification plan payment schedule; and         store the terms and the payment schedule of the loan modification plan.

\* \* \* \* \*